United States Patent
Ramamurthy et al.

(10) Patent No.: US 6,324,878 B1
(45) Date of Patent: Dec. 4, 2001

(54) STEERING LOCK DEVICE WITH SAFETY SYSTEM

(75) Inventors: Rajkumar Ramamurthy, Auburn Hills; Conrad Pastwa, Orion Township; Joseph Khoury, Farmingtjon; Rafic Jergess, Farmington; Yih-Chin Lin, Ferndale, all of MI (US)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 09/383,451

(22) Filed: Aug. 26, 1999

(51) Int. Cl.[7] .................................................. B60R 25/02
(52) U.S. Cl. ............................................. 70/186; 292/144
(58) Field of Search ............................. 70/182–186, 252; 292/144

(56) References Cited

U.S. PATENT DOCUMENTS

| | | | |
|---|---|---|---|
| 3,132,503 | * 5/1964 | Pieck et al. | 70/252 |
| 3,596,483 | * 8/1971 | Elliott | 70/186 X |
| 4,643,009 | * 2/1987 | Sato | 70/252 |
| 4,784,415 | * 11/1988 | Malaval | 70/282 X |
| 4,907,427 | * 3/1990 | Armstrong | 70/252 |
| 5,136,284 | * 8/1992 | Kitamura | 70/252 X |
| 5,454,238 | * 10/1995 | Ross et al. | 70/252 X |
| 5,473,922 | * 12/1995 | Bair et al. | 292/144 X |
| 5,634,358 | * 6/1997 | Myers | 70/185 X |
| 5,848,540 | 12/1998 | Pieper | 70/252 |
| 5,896,765 | 4/1999 | Peyre et al. | 70/186 |
| 5,938,254 | * 8/1999 | Weyerstall | 292/144 X |
| 6,125,671 | * 10/2000 | Suzuki | 70/252 X |
| 6,233,986 | * 5/2001 | Suzuki et al. | 70/252 X |

FOREIGN PATENT DOCUMENTS

| | | | |
|---|---|---|---|
| 2615892 | * 12/1988 | (FR) | 70/252 |
| 463825 | * 6/1951 | (IT) . | |
| 1-175543 | * 7/1989 | (JP) . | |

* cited by examiner

Primary Examiner—Lloyd A. Gall
(74) Attorney, Agent, or Firm—Karl D. Kovach

(57) ABSTRACT

A steering lock device includes an override cam slidingly engageable with a steering column, a lock bolt engageable with a recess on a steering shaft, and an override spring clutch attaching the lock bolt to the override cam. In a locked position, i.e., the steering wheel can not rotate, the lock bolt engages the recess of the steering shaft. In an unlocked position, i.e., when the steering wheel can freely rotate, the lock bolt is disengaged from the recess of the steering shaft. When the ignition key is removed from the ignition switch, the lock bolt engages the recess of the steering shaft. When the ignition key enters the ignition switch and is rotated, the lock bolt is removed from the recess of the steering shaft.

4 Claims, 6 Drawing Sheets

STEERING LOCK DEVICE WITH SAFETY SYSTEM

BACKGROUND OF THE INVENTION

1. Field of the Invention

The present invention relates to locking devices used in automotive applications. The invention more particularly concerns the locking of a steering shaft to a steering column of an automobile so as to prevent rotation of the steering shaft during selected periods of time. Thus, the locking device can be used as a safety device and an anti-theft device.

2. Discussion of the Background

For years now, automobile manufacturers have been including, as a standard feature, the feature of an immobilized steering shaft when the ignition key is not inserted into the ignition switch. The immobilized steering shaft prevents the steering wheel from rotating, thus, someone not having the ignition key can not steer the car if the car is hot-wired or if someone attempts to push the car away. The theft deterrent function works so well that people who attempt to take a car without using a key, typically, employ a large screwdriver-type of device inserted into the opening for the ignition key to break, bust open, and remove the ignition device that immobilizes the steering shaft. Thus, in a single act of violence, the person breaking into the vehicle can disable both the ignition function and the steering immobilization function. Once, the person has successfully removed the device, the vehicle can then be easily hot-wired and driven away. Such a device that integrates the two functions is disclosed in U.S. Pat. No. 5,848,540. FIG. 6 is a perspective view of a portion of a steering column 180 that accommodates a combined ignition switch and steering wheel anti-rotation device.

Attempts have been made to separate the ignition function and the anti-rotation of the steering wheel function in an attempt to make more complicated the act of automobile theft. The person attempting to steal an automobile will now need to disengage the anti-rotation device and the ignition switch separately, which will consume much more time and make it more likely that the person will be caught in the act. As such, it is presumed that a person inclined to steal the automobile of another person will not do so since the risk is not worth the effort. An example of a device that focuses on one of the functions, the anti-rotation function, is disclosed in U.S. Pat. No. 5,896,765, and European Patent Application No. EP764566A1. However, the highly motivated car thief may take their chances and attempt to steal an automobile incorporating the steering wheel locking devices disclosed in U.S. Pat. No. 5,896,765. The car thief would find that the locking element is one large piece of material. The car thief can beat or impact on it with push loads and either bend it, locally bend the steering shaft, or break the housing around the locking element, thus disarming the locking function.

An added benefit of placing the ignition switch in another location such as the dashboard is that the steering column area is made less busy for the driver of the vehicle. This is important since, currently, the steering column area is very busy, since it incorporates controls for directional indicators, head lamps, cruise control, windshield wipers, and etc.

Thus, there is a need for a steering lock device which is separate from the ignition switch and which prevents the destruction of the locking element when a thief attempts to disengage the steering lock device.

SUMMARY OF THE INVENTION

It is an object of the invention to provide a steering lock device with safety system that separates the ignition function from the anti-rotation function.

It is a further object of the invention to provide a device which decreases the probability that a thief will be able to steer the wheel of a hot-wired automobile.

It is another object of the invention to provide a device which is low in cost to produce.

It is still yet another object of the invention to provide a device which fits within a small envelope.

It is another object of the invention to provide a steering lock device which fits within the space currently allocated for a conventional key activated ignition system located on the steering column.

It is still further another object of the invention to provide a steering lock device which has few moving parts and as such is highly reliable.

In one form of the invention the steering lock device with safety system includes an override cam slidably attachable to a steering column of an automobile. The override cam is attached to a lock bolt by way of an override spring clutch. The lock bolt being engageable with a recess formed on the surface of the steering shaft. In a locked position, the lock bolt engages the recess of the steering shaft. In an unlocked position, the lock bolt is withdrawn and disengaged from the recess. When the ignition key is turned to start the automobile, the lock bolt moves away from the recess. When the ignition key is turned to stop the automobile engine from idling, the lock bolt moves toward and engages the recess.

In yet another form the invention, the device is mounted on an automobile. The automobile having a chassis, a motor mounted on the chassis, a steering shaft rotatably mounted on the chassis, a steering column substantially surrounding the steering shaft, the steering column attached to the chassis. The steering shaft having a recess formed on its surface. An override bolt being engageable with the recess of the steering shaft. An override cam slidably attached to the steering column. An override spring clutch attached to the override cam and to the lock bolt. In a locked position, the lock bolt engages the recess. In an unlocked position, the lock bolt is withdrawn from the recess.

Thus, the invention achieves the objectives set forth above. The invention provides a device which is physically separate from the ignition function and which increases the effort required to steal an automobile equipped with the steering lock device. Additionally, the device fits within existing real estate on the steering column and has few moving parts which are inexpensive to produce and assemble. Therefore, even in the most violent of environments, the steering lock device will perform as intended and deter the theft of the vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
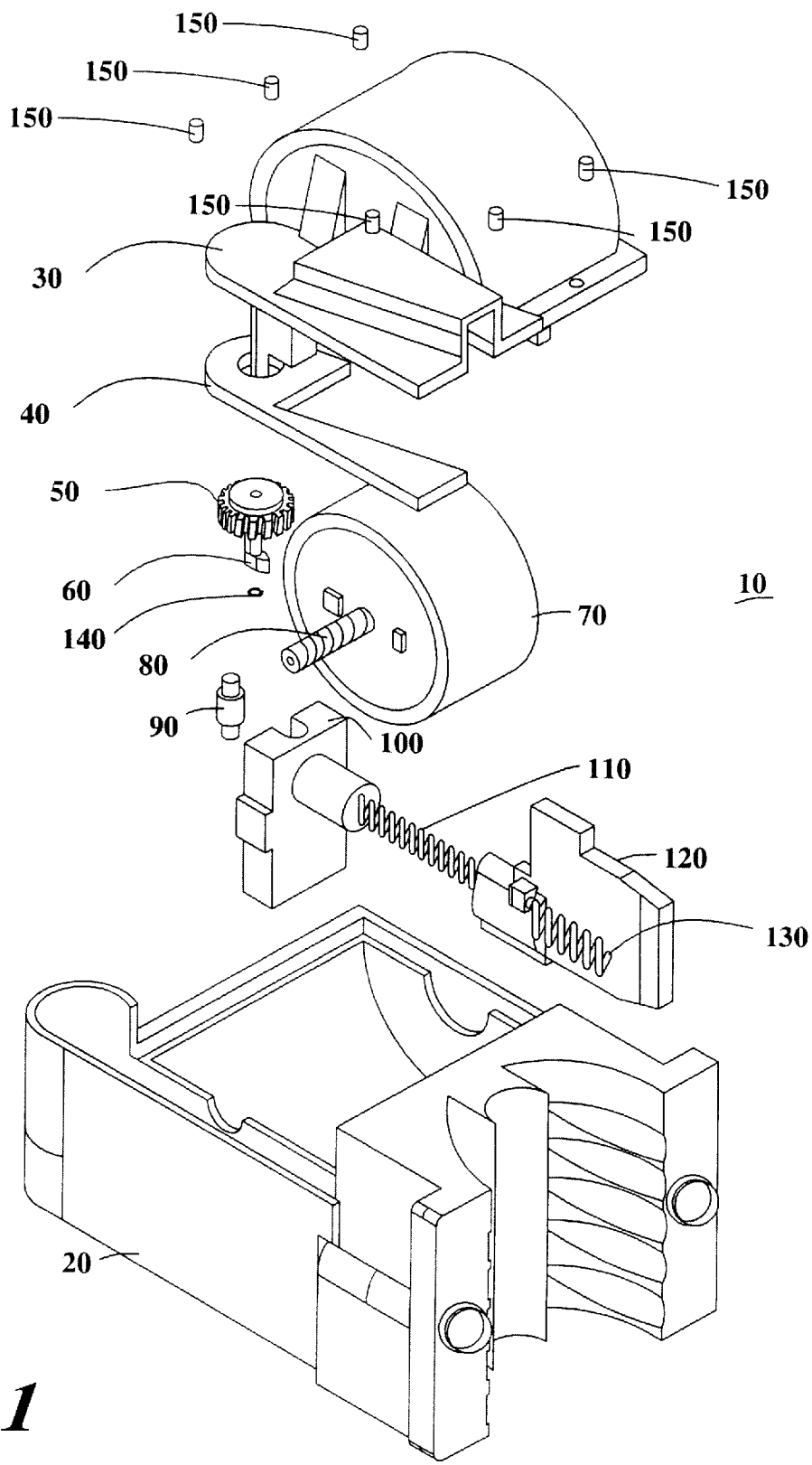
FIG. 1 is an exploded perspective view of the steering lock device.
Figure 2:
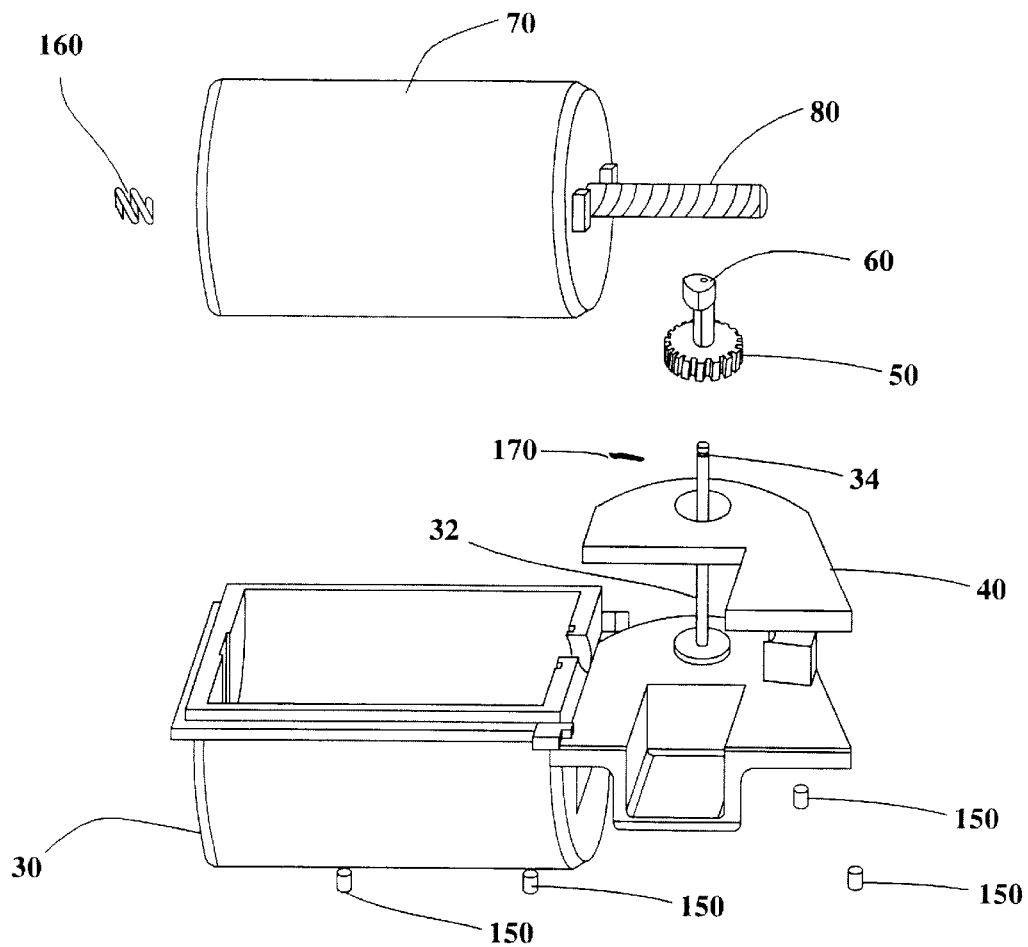
FIG. 2 is an exploded perspective view of the motor, cam, worm, worm gear, PCB, and a portion of the housing of FIG. 1 from a different perspective.

Referring now to the drawings, wherein like reference numerals designate identical or corresponding parts throughout the several views, and more particularly to FIGS. 1–5 thereof, an embodiment of the present invention is a steering lock device with safety system 10 as shown in FIG. 1 as an exploded perspective view. FIG. 1 displays a motor 70 having a worm 80. The worm 80 is the rotational output of the motor 70. The worm 80 meshes with a worm gear 50. The worm gear 50 is rotatably mounted on an idling shaft 32 (FIG. 2). The idling shaft 32 is attached to a cover 30. A cam 60 is formed on the worm gear 50. A c-clip or snap ring 140 attaches to the idling shaft 32 so as to secure the worm gear 50. A printed circuit board (PCB) 40 is situated between the cover 30 and the worm gear 50. The PCB 40 contains the logic which controls the motor 70. Electrical power is supplied to the device 10 from a twelve volt automobile battery (not shown). The cover 30 mounts on the housing 20. A cam roller 90 contacts the cam 60. The cam roller 90 is housed within an override cam 100. The cam roller 90 is free to rotate about its longitudinal axis. The override cam 100 is slidably attached to the housing 20. Attached to the override cam 100 is an override spring clutch 110. Attached to another end of the override spring clutch 110 is a lock bolt 120. Attached to the lock bolt 120 are lock bolt return springs 130. Retaining pins 150 align the cover 30 with the housing 20. The motor 70, worm 80, worm gear 50, cam 60, PCB 40, cam roller 90, override cam 100, override spring clutch 110, lock bolt 120, lock bolt return springs 130, and other miscellaneous components all being situated in the housing 20 and the cover 30.

FIG. 2 is an exploded perspective view of an area around the motor 70 taken from a different vantage point than in FIG. 1. A cam contact 170 is fixedly secured to the cover 30. The cam contact 170 is electrically connected to the PCB 40. The cam contact 170 is positioned in the cover 30 so as to make contact with the cam 60, when the cam 60 is in the unlocked position. The cam contact 170 sends an electrical signal to the PCB 40 which communicates whether the cam 60 is in contact with the cam contact 170 or not in contact with the cam contact 170. A motor spring 160 is positioned between the motor 70 and either one or both of the housing 20 and the cover 30. The motor spring 160 urges the motor 70 against the cover 30 so as to minimize movement of the motor 70 and to ease the assembly of the motor 70 in the cover 30 and to accommodate the presence of mounting tolerances and alignment requirements between the worm 80 and the worm gear 50. The idling shaft 32 has a recess 34 which accepts the snap ring 140.

Figure 3:
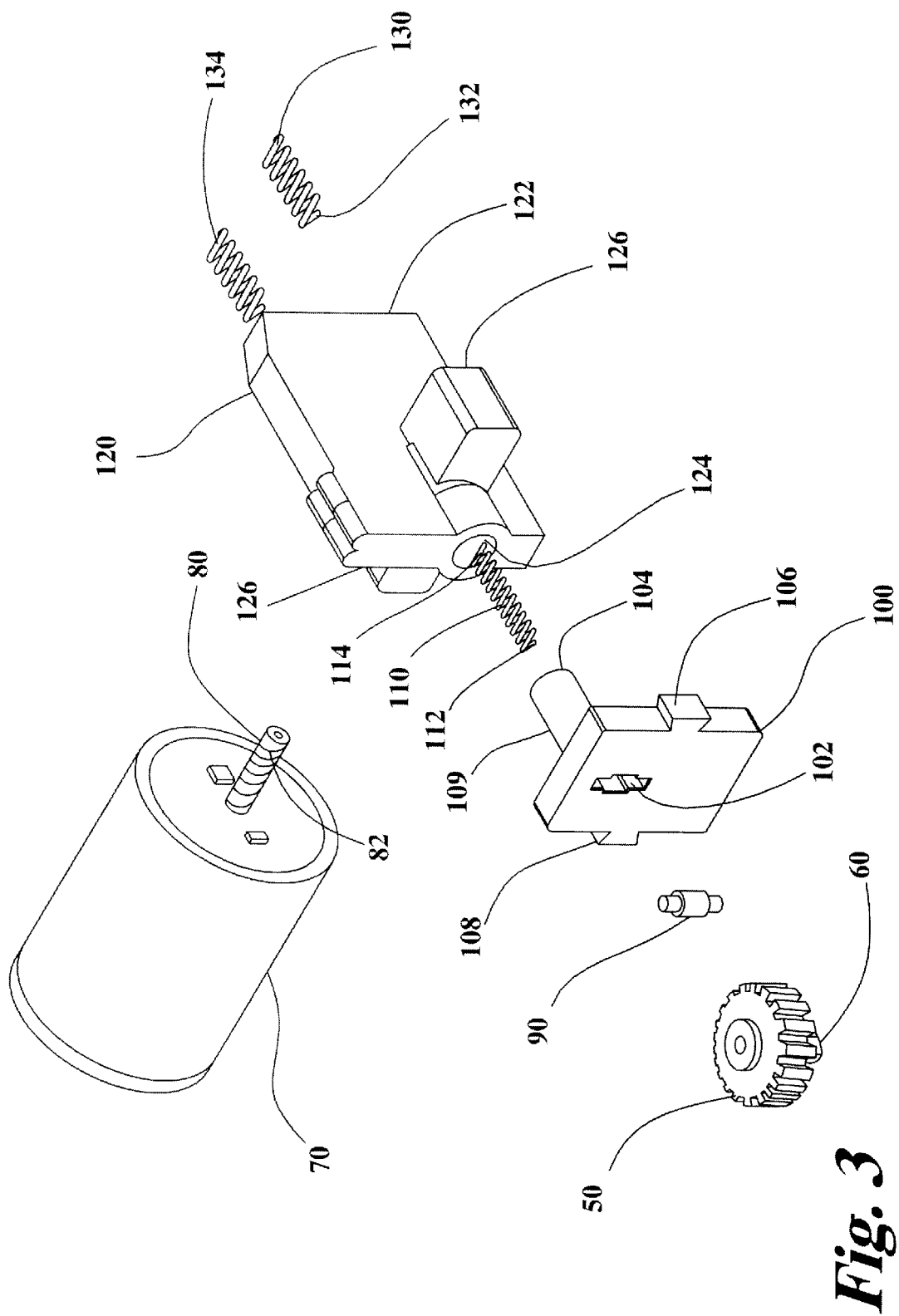
FIG. 3 is an exploded perspective view of the override cam, cam roller, override spring clutch, lock bolt, bolt return springs, motor, and worm gear of FIG. 1 from a different perspective.

FIG. 3 is an exploded perspective view of the components in the locking region. The override cam 100 has guide ways 106, 108 that fit with corresponding features in the housing 20. The override cam 100 is free to translate within the housing 20. The override cam 100 has a cam roller receiving slot 102 for housing the cam roller 90. The cam roller 90 is free to rotate about its longitudinal axis within the cam roller receiving slot 102. The override cam 100 has an extended portion 109. The override cam 100 has an override spring clutch receiving recess 104 formed in the extended portion 109 for receiving a first end 112 of the override spring clutch 110. The worm 80 has a single tooth helix 82. Preferably, the worm 80 rotates fifty-five times for every revolution of the worm gear 50. Also, the lead angle of the helix 82 of the worm 80 is less than five degrees. The lead angle is designed to be greater than the friction angle so that the worm 80 can not be back-driven by the worm gear 50. The lock bolt 120 has an engagement end 122 and spring seats 126. The engagement end 122 engages the recess formed on the steering shaft (not shown). Each spring seat 126, 126 accommodates one of the lock bolt return springs 130, 134. Lock bolt return spring 130 has an end 132 which contacts the spring seat 126. The other end of the lock bolt return spring 130 reacts against the housing 20. Lock bolt return spring 134 is similarly positioned. The distance from the spring seat 126 to the engagement end 122 is less than the undeformed length of either of the two lock bolt return springs 130, 134. However, the length of each of the lock bolt return springs 130, 134 are substantially the same. The lock bolt 120 has an override cam recess 124 for receiving end 114 of the override spring clutch 110. The spring rate of the lock bolt return springs 130, 134 are sized so as to overcome the frictional force present between the engagement end 122 of the lock bolt 120 and the recess of the steering shaft, when the lock bolt 120 is to be withdrawn from the recess.

Figure 4:
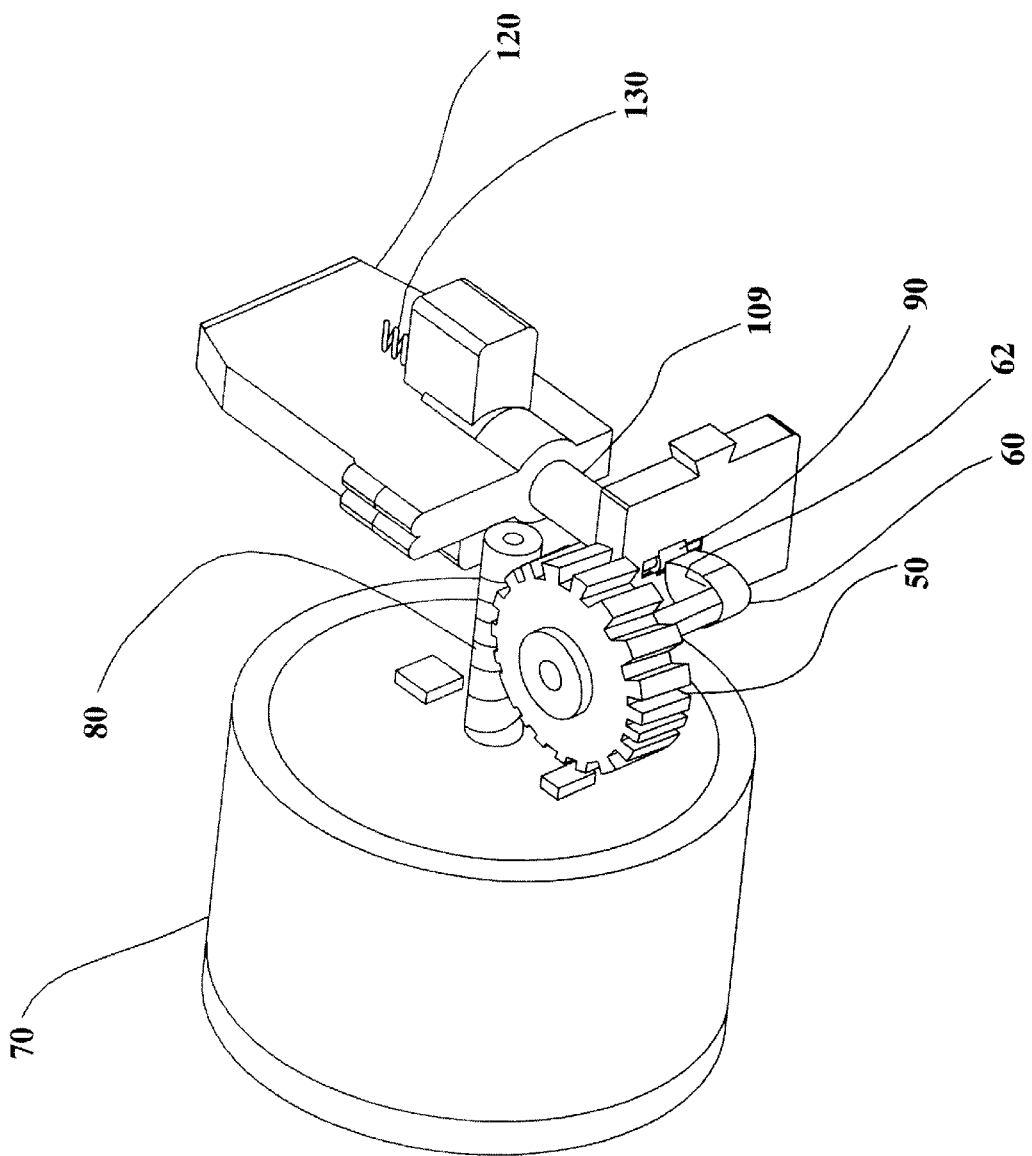
FIG. 4 is a perspective view of the assembled components of FIG. 3.

FIG. 4 is a perspective view of the assembled components as shown in FIG. 3. As shown in FIG. 4, the extended portion 109 of the override cam 100 slidably engages the override cam recess 124 so as to surround the override spring clutch 110. A moment arm 62 of the cam 60 is shown as pressing against the cam roller 90. The moment arm 62 is defined as the perpendicular length from the rotational axis of the worm gear 50 to the tip of the cam 60 which is furthest from the rotational axis of the worm gear 50. The cam 60, shown in FIG. 4, is in a locked position which is characterized by the longest portion of the moment arm 62 pressing against the cam roller 90. FIG. 4 also shows that the rotational axis of the worm gear 50 being substantially perpendicular to the rotational axis of the worm 80. Furthermore, the lock bolt 120 translates in a direction which is substantially perpendicular to both the rotational axes of the worm gear 50 and the worm 80.

Figure 5:
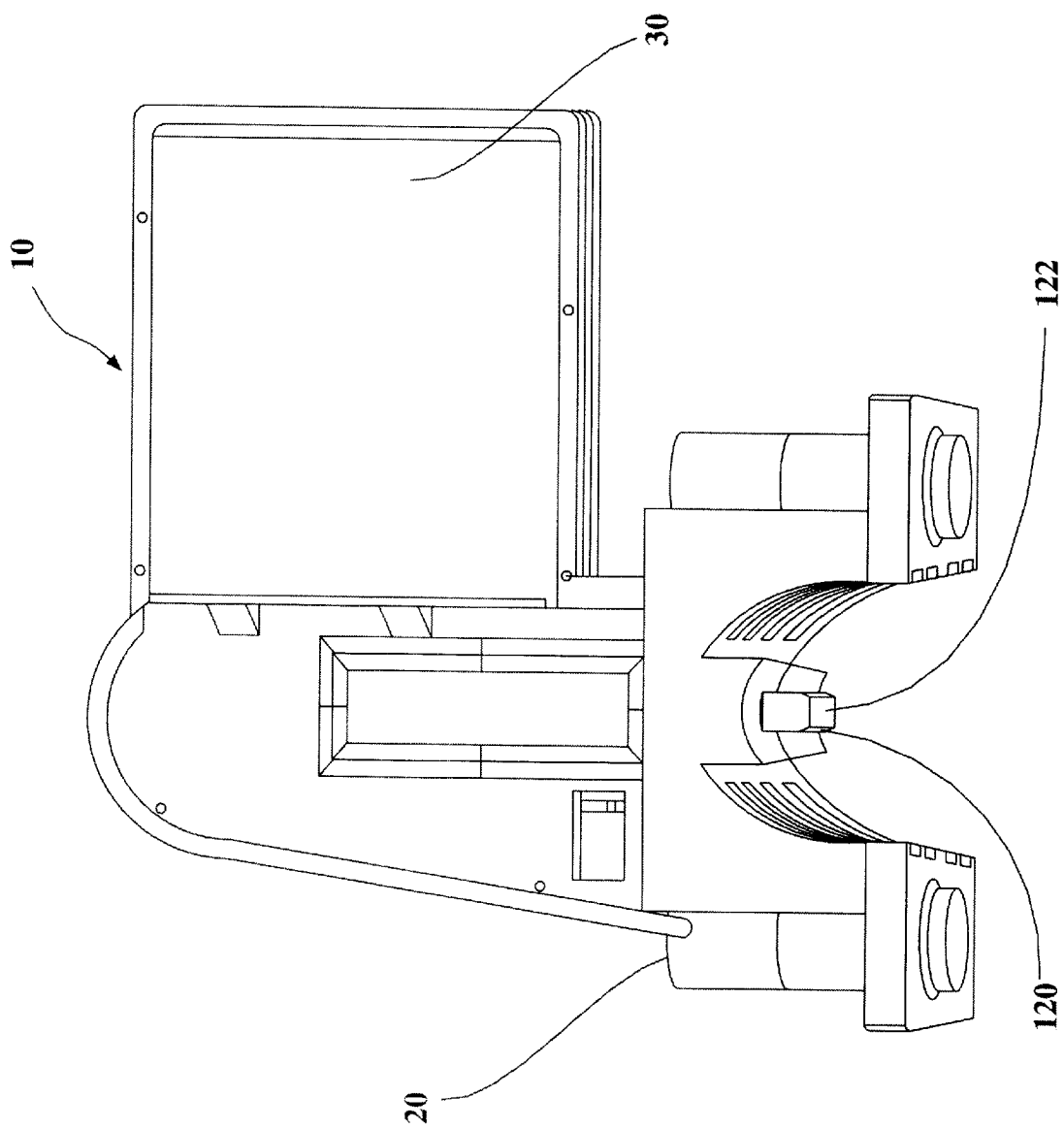
FIG. 5 is a perspective view of the assembled steering lock device with safety system.

FIG. 5 is a perspective view of the assembled steering lock device with safety system 10. The cover 30 and housing 20 substantially surround the moving components of the device 10. The device 10 is mountable onto the steering column of the automobile. The engagement end 122 of the lock bolt 120 is shown extending, in a locked position, from an opening in the housing 20.

Figure 6:
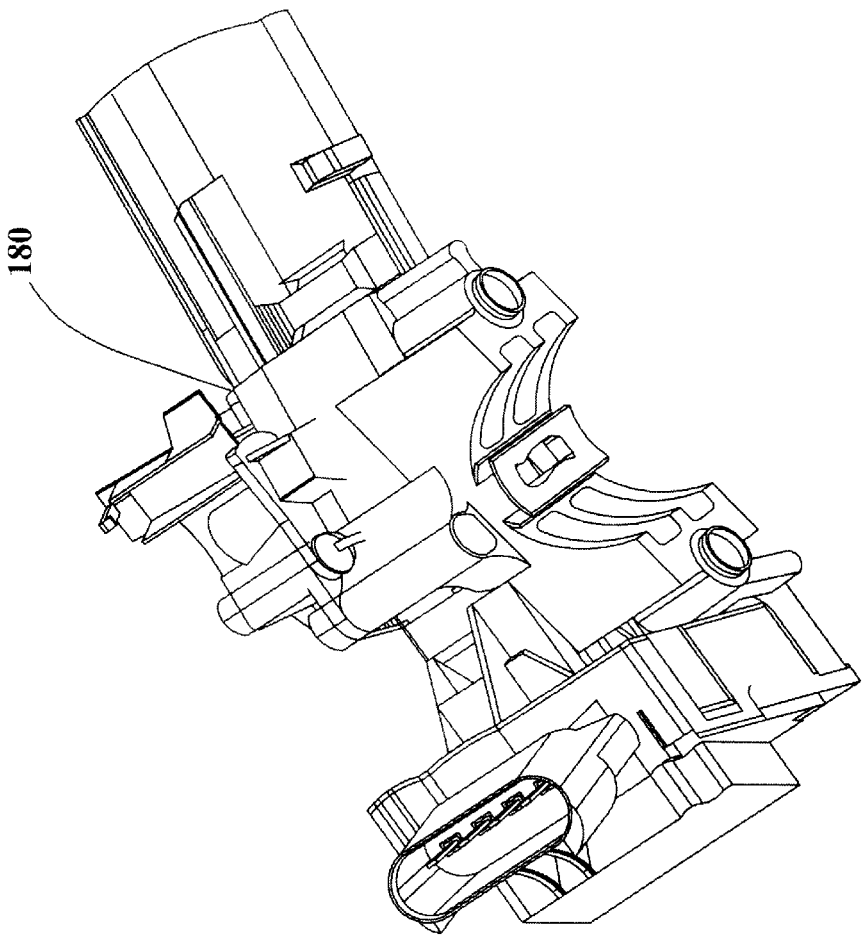
FIG. 6 is a perspective view of the steering column of a conventional automobile that accommodates a combined ignition switch and anti-rotation device.

As compared to the existing device 180, shown in FIG. 6, it is apparent that the steering lock device with safety system 10 fits onto the location of the existing device 180 without modifying the steering column or the recess formed in the steering shaft.

The housing 20, cover 30, and the override cam 100 are preferably made of typical die cast metals. The lock bolt 120 is made of a sintered metal. The motor spring 160 and the cam contact 140 are made of CuSn6. The worm 80 is made of brass. The cam 60 is insert molded about the worm gear 50. The other components are made from materials commonly found in the art. Grease is used as the lubricant between the relative moving parts of the device 10, however, other lubricants may be used.

In operation in one state, the engagement end 122 of the lock bolt 120 engages a recess on the surface of the steering shaft (not shown). The lock bolt return springs 130 and the override spring clutch 110 are in a compressed state. The cam 60 of the worm gear 50 is in contact with the cam roller 90. The largest extent or distance of the moment arm 62 of the cam 60 contacts the cam roller 90. The override cam 100 is in a state of compression since the compressed override spring clutch 110 is pressing against it. The non-backdrivability of the mesh between the worm 80 and the worm gear 50 prevents the force generated by the compressed lock bolt return springs 130, 134 from back driving the motor 70 and thus losing the state of engagement of the engagement end 122 of the lock bolt 120 with the recess formed in the surface of the steering shaft. A lock bolt contact (not shown) is attached to the housing 20 and sends an electrical signal to the PCB 40 when the lock bolt 120 is in the engaged position. The lock bolt contact sends an electrical signal to the PCB 40 when the lock bolt 120 is in the engaged or locked position since the lock bolt 120 touches the lock bolt contact. Likewise, when the lock bolt 120 is withdrawn from the recess, the lock bolt contact alters the signal sent to the PCB 40, thus indicating that the lock bolt 120 is not fully engaged with the recess of the steering shaft. When the ignition key is introduced into the ignition and is rotated, the ignition switch sends an electrical signal to the PCB 40. The PCB 40 sends a signal to the motor 70. The motor 70 rotates the worm 80. The worm 80 rotates the worm gear 50. The worm gear 50 rotates its attached cam 60. The cam 60 allows the cam roller 90 to translate away from the steering shaft since the cam roller 90 contacts a portion of the cam 60 which has a smaller moment arm. Since the lock bolt return springs 130, 134 are longer than the distance separating the spring seats 126 from the engagement end 122 of the lock bolt 120, the lock bolt 120 is fully removable from the recess in the surface of the steering shaft thus allowing the steering shaft to rotate. Even in this position the override spring clutch 110 is slightly in a state of compression so as to keep the parts in a state of compression and as such prevents the parts from moving about. The device stays in this position while the engine of the vehicle is operating, i.e., the ignition key is in the ignition and has been rotated so as to start the vehicle. The logic in the PCB 40 signals the battery to stop sending power to the motor 70.

When the ignition key is rotated so as to be removed from the ignition switch, the ignition switch sends a signal to the PCB 40. The PCB 40 sends a signal to the motor 70. The motor 70 rotates the worm 80. The worm 80 rotates the worm gear 50. The worm gear 50 rotates its attached cam 60. The cam 60 translates the cam roller 90 towards the steering shaft. The longest part of the moment arm 62 contacts cam roller 90. The cam roller 90 translates the override cam 100. The override cam 100 translates the override spring clutch 110. The override spring clutch 110 has a stiffness which is greater than the combined stiffness of the lock bolt return springs 130, 134 thus the override spring clutch 110 compresses the lock bolt return springs 130, 134 and translates the engagement end 122 of the lock bolt 120 so that the lock bolt 120 engages the recess on the surface of the steering shaft thus locking up the steering shaft. At this position, the motor 70 stops turning. If the lock bolt 120 is not aligned with the recess, the engagement end 122 of the lock bolt 120 can not engage the recess, as such the override spring clutch 110 becomes compressed as the motor 70 translates the override cam 100 to the fully deflected position. Once the steering shaft is rotated so that the recess aligns with the lock bolt 120, the engagement end 122 of the lock bolt 120 will pop into the recess due to the force supplied by the overly compressed override spring clutch 110. If there was no override spring clutch 110 and the lock bolt 120 was solidly attached to the override cam 100, the lock bolt 120 would push up against the steering shaft as above, however, the motor 70 would continue to try to rotate and as such would be burned out since it would not be able to rotate.

The motor 70 operates at high speed and provides low torque. The gear ratio through the worm and worm gear is very large and outputs low speeds and high torque. The large torque is converted into a force at the interface between the cam 60 and the cam roller 90. The force is large enough to overcome the force produced by the lock bolt return springs 130, 134 and the override spring clutch 110 when they are being compressed. From the time the motor 70 is activated it takes approximately one-half second to lock or unlock the device.

Out in the field, a would-be-thief presented with the device 10 will not find a key hole that is mated to an anti-rotation system into which a screwdriver-like device can be inserted so as to break and disarm the ignition and anti-rotation device. Therefore, the would-be-thief must first break through the cover 30 or the housing 20 of the device 10, which is not any easy task. Then, the would-be-thief would push on the override cam 100 with the screwdriver-like device, however, now, the screwdriver-like device translates the override cam 100 which in turn deflects and compresses the override spring clutch 110. Due to the placement of the override spring clutch 110 the lock bolt 120 is not subject to the jarring impacts which break apart the prior art devices. In this case the override cam 100 merely bounces back and forth. As such, in order to disengage the anti-rotation system of the device 10, as compared to the prior art devices, the would-be-thief would need to expend more time and effort to defeat the system. Thus, the device 10 provides a low cost, easy to assemble, small, reliable steering lock device with safety system 10 which deters theft.

Obviously, numerous modifications and variations of the present invention are possible in light of the above teachings. For example, the seals discussed above can be used for many alternative electrical connectors for automotive and non-automotive applications. It is therefore to be understood that within the scope of the appended claims, the invention may be practiced otherwise than as specifically described herein.

What is claimed is:

1. A steering lock device comprising:

an override cam;

a lock bolt;

an override spring clutch attaching the override cam to the lock bolt;

an electric motor having a rotational output shaft;

a worm connected to the rotational output shaft of the motor;

a worm gear meshed with the worm so as to form a mesh, wherein the mesh between the worm and the worm gear is non-backdriveable, and wherein a gear ratio at the mesh between the worm gear and the worm is greater than fifty to one, so that the worm gear rotates at least one revolution for every fifty revolutions of the worm;

a cam attached to the rotational axis of the worm gear, the cam having a moment arm extending substantially perpendicular to the rotational axis of the worm gear, and a cam roller slidingly and rollingly engaged with the cam, the cam roller mounted within and contacting the override cam, wherein, in a locked position, the cam roller is positioned near the free end of the moment arm, and, in an unlocked position, the cam roller is near the rotational axis of the worm gear.

2. A steering lock device according to claim 1, further comprising a printed circuit board connected to the electric motor.

3. A steering lock device according to claim 2, further comprising a lock bolt return spring connected to the lock bolt.

4. A steering lock device according to claim 3, further comprising a housing enveloping the motor, worm, worm gear, cam, override cam, cam roller, printed circuit board and override spring clutch.

* * * * *